United States Patent
Zemach et al.

(10) Patent No.: US 12,432,211 B2
(45) Date of Patent: Sep. 30, 2025

(54) INTERLEAVED EXACT-MATCH LOOKUP TABLE FOR MULTIPLE PACKET PROCESSING APPLICATIONS IN A NETWORK DEVICE

(71) Applicant: Marvell Israel (M.I.S.L) Ltd., Yokneam (IL)

(72) Inventors: Rami Zemach, Givat Shapira (IL); Itay Peled, Hagor (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 301 days.

(21) Appl. No.: 18/208,015

(22) Filed: Jun. 9, 2023

(65) Prior Publication Data

US 2023/0403281 A1    Dec. 14, 2023

Related U.S. Application Data

(60) Provisional application No. 63/350,434, filed on Jun. 9, 2022.

(51) Int. Cl.
*H04L 29/06* (2006.01)
*H04L 9/40* (2022.01)

(52) U.S. Cl.
CPC ........ *H04L 63/101* (2013.01); *H04L 63/0245* (2013.01)

(58) Field of Classification Search
CPC .......................... H04L 63/101; H04L 63/0245
See application file for complete search history.

(56) References Cited

U.S. PATENT DOCUMENTS

| | | |
|---|---|---|
| 7,859,877 B2 | 12/2010 | Mondaeev |
| 8,176,242 B1 | 5/2012 | Shamis et al. |
| 8,743,897 B2 * | 6/2014 | Lee ................ H04L 12/2801 370/312 |
| 9,171,030 B1 | 10/2015 | Arad |
| 9,672,239 B1 | 6/2017 | Rottenstreich |
| 9,819,637 B2 | 11/2017 | Roitshtein et al. |
| 9,871,728 B2 | 1/2018 | Arad |
| 10,110,492 B2 | 10/2018 | Levy |

(Continued)

OTHER PUBLICATIONS

International Search Report and Written Opinion for PCT Application No. PCT/IB2023/055987, mailed Sep. 22, 2023 (15 pages).

*Primary Examiner* — Evans Desrosiers

(57) ABSTRACT

A search engine of a network device performs a lookup based on packet information associated with a packet being processed using a plurality of packet processing applications. The lookup includes one or more accesses to a lookup table that includes a plurality of interleaved entries associated with different ones of the packet processing applications. For each access, the search engine generates a search key to include at least a search string generated based on the packet information and an application identifier indicating a packet processing application for which the lookup is being performed, identifies an entry based on the search key, determines whether the search key matches search information in the identified entry, and when the search key matches the search information in the identified entry, identifies an action to be performed by the packet processor in connection with processing the packet by the packet processing application.

20 Claims, 3 Drawing Sheets

(56) References Cited

U.S. PATENT DOCUMENTS

| | | |
|---|---|---|
| 10,243,865 B2 | 3/2019 | Izenberg |
| 11,362,948 B2 | 6/2022 | Shmilovici Leib |
| 2003/0039135 A1* | 2/2003 | Srinivasan ............. G11C 15/00 |
| | | 365/49.1 |
| 2007/0011734 A1* | 1/2007 | Balakrishnan ...... H04L 63/0245 |
| | | 726/13 |
| 2008/0071757 A1* | 3/2008 | Ichiriu .................. G06F 16/951 |
| 2011/0161580 A1 | 6/2011 | Shah |
| 2017/0052731 A1 | 2/2017 | Levy |

* cited by examiner

INTERLEAVED EXACT-MATCH LOOKUP TABLE FOR MULTIPLE PACKET PROCESSING APPLICATIONS IN A NETWORK DEVICE

CROSS REFERENCES TO RELATED APPLICATIONS

This application claims the benefit of U.S. Provisional Patent Application No. 63/350,434, entitled "Flexible Sharing of Access List (ACL) and Exact Match (EM)," filed on Jun. 9, 2022, the disclosure of which is hereby expressly incorporated herein by reference in its entirety.

FIELD OF TECHNOLOGY

The present disclosure relates generally to network devices, and more particularly, to network devices performing lookups using packet information.

BACKGROUND

Network devices, such as network switches, routers, bridges, etc., process packets using various packet processing applications. For example, a network device processes a packet using a forwarding application to determine an egress port via which to transmit, a longest prefix match (LPM) application to determine a route for the packet, a network device processes a packet using an access control list (ACL) application to determine an action to apply to the packet, such as whether to transmit or drop the packet, etc. Such network devices typically use various memories that store one or more lookup tables to support the various packet processing applications. The lookup tables store search patterns, sometimes referred to as rules, and corresponding actions to be performed with respect to packets that match the stored rules.

Typically, respective different memories are used to store lookup tables that include rules related to different ones of the packet processing applications or a single memory is provided that is shared by multiple packet processing applications. When a shared memory is used, different portions of the memory, such as different memory banks within the shared memory, are allocated to different ones of the packet processing application. Thus, when a lookup is performed in the memory on behalf of a particular packet processing application, the lookup is performed in entries that are stored in the memory portion allocated to the particular packet processing application. Similarly, when an entry for use by a particular packet processing application is added to the shared memory, the entry must be added to a memory partition that is allocated to the packet processing application. Because different memory portions are allocated to different packet processing applications, the shared memory in a typical network device is not flexibly shared by the packet processing applications. For example, if a first memory portion allocated to a first packet processing application is full, a new entry for use by the first packet processing application cannot be added to the shared memory even if memory space is available in a second memory portion allocated to a second processing application.

Some conventional network devices support multiple rule templates, such as multiple IP address prefix lengths, multiple access rules depending on source, destination, protocol version, etc. of packets, etc. for a particular packet processing application. Such conventional network devices typically use a content accessible memory, such as a ternary content addressable memory (TCAM), to store the rules. A typical TCAM allows for the multiple search patterns, corresponding to the multiple rule templates, to be searched based on packet information in a single memory access. However, while a TCAM allows for multiple search patterns to be searched in a single memory access, a TCAM is typically expensive in terms of cost, power consumption, occupied area, etc. in a network device.

SUMMARY

According to an embodiment, a network device comprises: a packet processor configured to process packets communicated over a network, the packet processor being configured to process a packet using a plurality of packet processing applications; and a search engine configured to perform a lookup based on packet information associated with a packet being processed by the packet processor, the lookup including one or more accesses to a lookup table that includes a plurality of interleaved entries including entries of at least a first set of entries associated with a first packet processing application interleaved with entries of a second set of entries associated with a second packet processing application different from the first packet processing application, the search engine being configured to, for each of the one or more accesses to the lookup table: generate a search key to include at least i) a search string generated based on the packet information associated with the packet and ii) an application identifier indicating a particular packet processing application, among the plurality of packet processing applications, for which the lookup is being performed, identify, based on the search key, an entry from among the interleaved entries in the lookup table, determine whether the search key matches search information in the identified entry in the lookup table, the search information including the application identifier of the particular packet processing application, and in response to determining that the search key matches the search information in the identified entry in the lookup table, identify an action to be performed by the packet processor in connection with processing the packet by the particular packet processing application, the action being associated with the entry in the lookup table.

According to another embodiment, a method for determining actions to be performed on packets in a network device includes: receiving a packet at a packet processor of the network device, the packet processor configured to process the packet using a plurality of packet processing applications; and performing one or more accesses to a lookup table based on packet information associated with the packet, including, for each memory access among the one or more memory access, generating, at the network device, a search key for the packet, the search key including at least i) a search string generated based on the packet information associated with the packet and ii) an application identifier indicating a particular packet processing application, among the plurality of packet processing applications, for which the lookup is being performed; identifying, by the network device based on the search key, an entry from among a plurality of interleaved entries in the lookup table, the plurality of interleaved entries including at least a first set of entries associated with a first packet processing application among the plurality of packet processing operations interleaved with a second set of entries associated with a second packet processing application among the plurality of packet processing applications, the second packet processing application being different from the first packet processing application; determining whether the search key matches search information in the identified entry in the lookup table, the search information including the identifier of the particular packet processing application; and in response to determining that the search key matches the search information in the identified entry in the lookup table, identifying an action to be performed by the packet processor in connection with processing the packet by the particular packet processing application, the action being associated with the entry in the lookup table.

DETAILED DESCRIPTION

Figure 1:
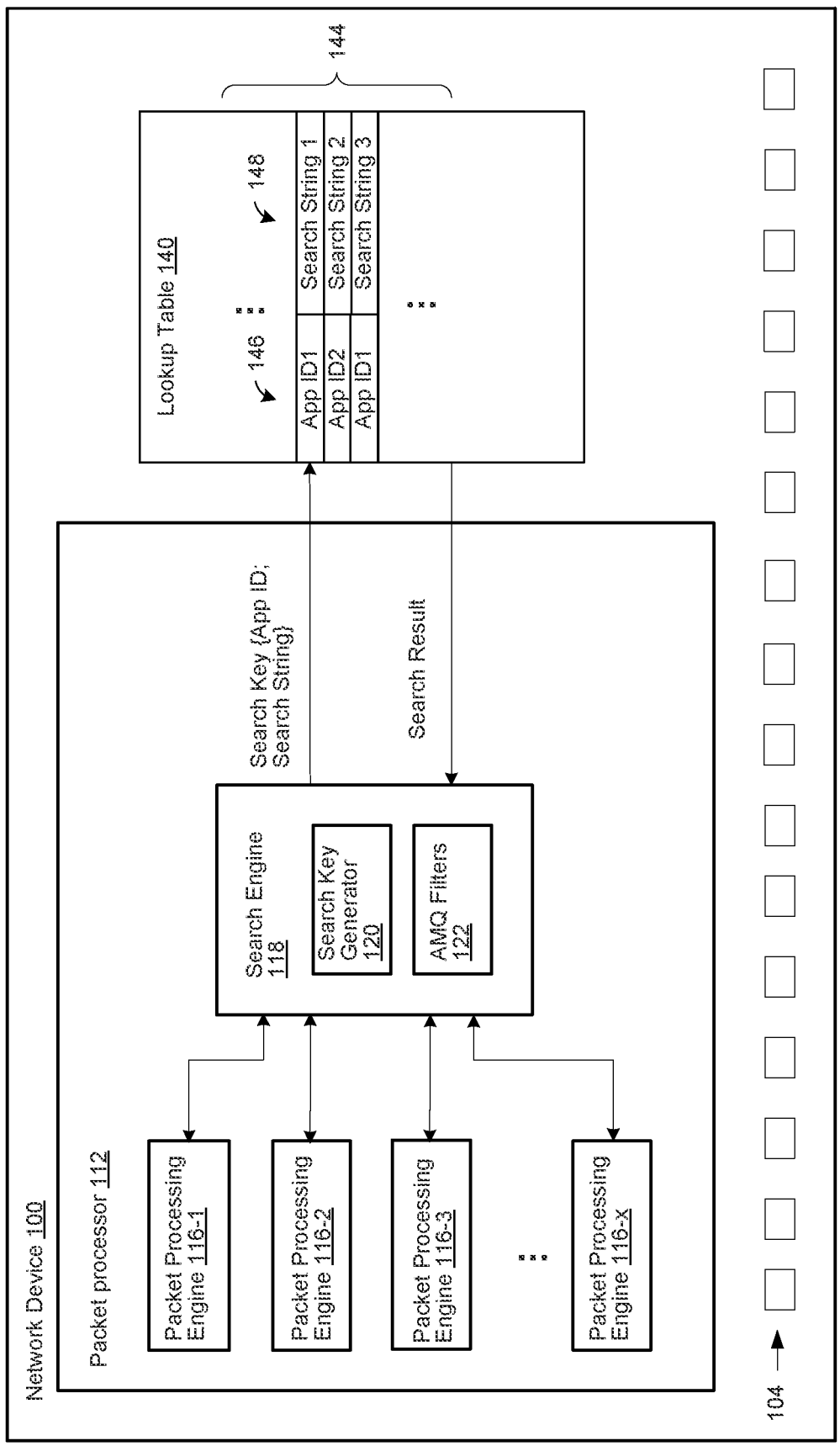
FIG. 1 is a simplified block diagram of an example network device that includes an exact-match lookup table having interleaved entries associated with a plurality of packet processing applications, according to an embodiment.

As discussed above, in conventional network devices, different packet processing applications typically use lookup tables stored in different memories, or different portions of a memory, that are allocated to the packet processing applications. Thus, in a conventional network device, when an entry for use by a particular packet processing application is added to the shared memory, the entry must be added to a memory or a memory portion that is allocated to the packet processing application. Because in the conventional network device different memory portions are allocated to different packet processing applications, the memory in the conventional network device is not flexibly shared by the packet processing applications. For example, if a first memory portion allocated to a first packet processing application is full, a new entry for use by the first packet processing application cannot be added to the shared memory even if memory space is available in a second memory portion allocated to a second processing application.

In embodiments described below, a lookup table stored in a memory of a network device includes interleaved entries associated with different packet processing applications implemented by the network device. For example, the lookup table includes a first set of entries associated with a first packet processing application and a second set of entries associated with a second packet processing application, with entries among the first set of entries being interleaved with entries among the second set of entries in the lookup table. In an embodiment, the entries in the lookup table include application identifiers that indicate the associated packet processing applications. The network device also includes a search engine configured to generate a search key for a packet being processed by a packet processing application, the search key including at least i) a search string generated based on packet information associated with the packet and ii) an application identifier indicating a particular packet processing application for which a lookup is to be performed by the network device. The search engine is configured to identify, based on the search key, an entry from among the interleaved entries in the lookup table and determine whether the search key matches search information in the identified entry in the lookup table, including the application identifier of the particular packet processing application. In response to determining that the search key matches the search information in the identified entry in the lookup table, identify an action to be performed by the packet processor in connection with processing the packet by the particular packet processing application.

At least in some embodiments, because the lookup table stored in the memory of the network device includes interleaved entries associated with different packet processing applications implemented by the network device, the memory of the network device is flexibly shared among the packet processing applications. For example, a new entry for use by any packet processing application among the packet processing applications can be added to the lookup table as long as memory space is available in the memory shared by the packet processing applications.

In some embodiments, the network device supports multiple rule templates, such as multiple IP address prefix lengths, multiple access rules depending on source, destination, protocol version, etc. of packets, etc. for each of at least some of the plurality of packet processing applications. As discussed above, typical network devices that support multiple rule templates for particular packet processing applications, store the rules in a content accessible memory, such as a ternary content addressable memory (TCAM), that allows for multiple search patterns to be searched in a single memory access operation. As also discussed above, while a TCAM allows for multiple search patterns to be searched in a single memory access, a TCAM is typically expensive in terms of cost, power consumption, occupied area, etc. in a network device. In some embodiments described below, the lookup table that is shared by the packet processing applications is stored in a memory, such as a random access memory (RAM), that allows for a limited number OF search patterns (e.g., only one search pattern) to be searched in the lookup table at any given time. Such memory is generally less expensive in terms of cost, power consumption, occupied area, etc., as compared to a TCAM, in at least some embodiments. In some embodiments, the network device is configured to maintain a plurality of probabilistic data structures configured to provide indications of rule templates for which matching rules potentially exist in the lookup table. The network device is configured to apply packet information to multiple probabilistic data structures prior to performing one or more searches in the lookup table such that the searches are limited to only rule templates for which matching rules potentially exist in the lookup table. In at least some such embodiments use of the probabilistic data structure in the network device results in a minimized increase in the number of accesses needed to be performed to identify a matching rule based on packet information in a less expensing lookup table such as a lookup table stored in a random access memory of the network device.

FIG. 1 is a simplified block diagram of an example network device 100 that receives packets, processes the packets to determine network links via which the packets are to be forwarded, and transmits the packets via the determined network links, according to an embodiment. The network device 100 includes a plurality of network interfaces 104 (e.g., ports, link aggregate groups (LAGs), tunnel interfaces, etc.) configured to couple to network links. In various embodiments, the network device 100 includes any suitable number of network interfaces 104.

The network device 100 also includes a packet processor 112 that is configured to process packets (e.g., by analyzing header information in the packets and, optionally, metadata associated with packets, such indicators of ports of the network device that received the packets, etc.), in an embodiment. The packet processor 112 includes a plurality of packet processing engines 116 configured to implement a plurality of packet processing applications. For example, a first packet processing engine 116-1 may be a longest prefix match (LPM) engine configured to implement an LPM application, a second packet processing engine 116-2 may be an access control list (ACL) engine configured to implement an ACL application, a third packet processing engine 116-3 may be a forwarding engine configured to implement a forwarding application, etc.

The processing engines 116 are coupled to a search engine 118 which, in turn, is coupled to a lookup table 140. In an embodiment, the lookup table 140 is an exact match lookup table stored in a random access memory (RAM) device, a dynamic random access memory (DRAM) device, or other suitable memory device that is relatively less expensive as compared to a TCAM, for example. In an embodiment, the lookup table 140 is stored in a memory device that is external to the network device 100. For example, the lookup table 140 is a DRAM device provided externally to the network device 100.

The lookup table 140 includes a plurality of entries 144 that store indications of actions to be performed with respect to packets processed by the processing engines 116. In an embodiment, the entries 144 of the lookup table 140 include interleaved entries associated with different packet processing applications implemented by different ones of the processing engines 116. For example, the lookup table 140 includes at least a first set of entries 144 associated with a first packet processing application interleaved with entries 144 among a second set of entries associated with a second packet processing application. As an example, the lookup table 140 includes a first set of entries 144 associated with the LPM application implemented by the processing engine 116-1 and a second set of entries 144 associated with the ACL application implemented by the processing engine 116-2, with entries 144 among the first set of entries being interleaved with entries 144 among the second set of entries, according to an embodiment. As another example, the lookup table 140 includes a first set of entries 144 associated with the LPM application implemented by the processing engine 116-1, a second set of entries 144 associated with the ACL application implemented by the processing engine 116-2, and a third set of entries 144 associated with the packet forwarding application implemented by the processing engine 116-3, with entries 144 among the first set of entries being interleaved with entries 144 among the second set of entries and with entries 144 among the third set of entries, according to an embodiment. In various embodiments, because entries 144 associated with different packet processing applications are allowed to be interleaved in the lookup table 140, when the lookup 140 is populated with new entries 144, a new entry 144 is added in an available location in the lookup table 140 without regard to a particular packet processing application for which the new entry 144 is being added to the lookup table 140.

The search engine 118 is configured to perform lookups in the lookup table 140 based on packet information received from the packet processing engines 116, and to provide search results to the packet processing engines 116 indicating actions to be performed to process the packet by the packet processing engines 116, according to an embodiment. The search engine 118 is configured to perform a lookup in the lookup table 140 to identify an entry 144 among all of the entries 144 in the lookup table 140 without any application-specific partition of the entries 144 in the lookup table 140, according to an embodiment. In an embodiment, the packet information received by the search engine 118 from a packet processing engine 116 includes a set of one or more data fields associated with a packet being processed by the packet processing engine 116, such as one or more data fields from a header of the packet being processed by the packet processing engine 116. In some embodiments, the packet information received by the search engine 118 from the packet processing engine 116 additionally includes metadata associated with the packet being processed by the packet processing engine 116, such as such as an identifier of a port that received the packet, etc.

In an embodiment, each of at least some entries 144 in the lookup table 140 stores i) search information and ii) an indication of a processing action to be performed with respect to a packet when a search key generated for the packet by the search engine 118 matches the search information in the entry 144. The action to be performed with respect to the packet depends on the particular packet processing application that is processing the packet. For example, for an LPM application, the action to be performed with respect to the packet typically would be to route the packet associated with a prefix of a destination IP address included in a header of the packet that matches the search string in the entry 144. As another example, for an ACL application, the action to be performed with respect to the packet might be to drop the packet or to transmit the packet when a set of one or more data fields associated with the packet matches the search string in the entry 144. In an embodiment, the search information in each of at least some entries 144 in the lookup table 140 i) a respective first field 146 that stores an application identifier indicating a packet processing application and ii) a respective second field 148 that stores a search string. In some embodiments, search information in each of at least some of the entries 144 further includes a respective third field that stores an indication of an action to be performed by the packet processing application to process a packet when a search key generated based on packet information matches the search information in the entry 144.

The search engine 118 includes a search key generator 120, in an embodiment. The search key generator 120 is configured to generate search keys based on packet information received from the packet processing engines 116, in an embodiment. According to an embodiment, the search key generator 120 is configured to generate a search key for a packet to include i) a search string generated based on the packet information received from a packet processing engine 116 and ii) an application identifier indicating the packet processing application implemented by the processing engine 116. The search engine 118 is configured to perform a lookup in the lookup table 140 based on the search key, in an embodiment.

In an embodiment, the search engine 118 is configured to identify an entry 144 in the lookup table 140 based on a search key generated for a packet by the search key generator 120 based on packet information received from a packet processing engine 116. For example the search engine 118 is configured to identify the entry 144 in the lookup table 140 by hashing the search key based on a hash function to generate a hash value that indicates the entry 144 in the lookup table 140. The search engine 118 is configured to retrieve search information stored in the identified entry 144 and to determine whether the search information in the entry 144 matches the search key. In response to determining that the search information in the entry 144 match the search key, the search engine 118 is configured to provide the indication of the processing action stored in the entry 144 to the processing engine 116. The processing engine 116 is configured to receive the indication of the processing action from the search engine 118 and to perform the processing action with respect to the packet.

In some embodiments, the network device 100 supports multiple rule templates for each of at least packet processing applications. Accordingly, in an embodiment, the lookup table 140 includes, in association with each of at least some packet processing applications, entries 144 that store search information corresponding to different rule templates associated with the packet processing application. The different rule templates associated with a packet processing application include different subsets of data fields or bits selected from packet information associated with a packet. As an example, for an LMP application, different rule templates include different lengths prefixes of an IP address included in a header of a packet. For example, a first rule template associated with the LPM application includes 32 bits of the IP address, a second rule template associated with the LPM application includes first 28 bits of the IP address, a third rule template associated with the LPM application includes first 24 bits of the IP address, and a fourth rule template associated with the LPM application includes first 16 bits of the IP address, in an embodiment. As another example, for an ACL application, different rule templates include different data fields associated with the packet, such as a destination address field included in the header of the packet, a source address field included in the header of the packet, an IP version field included in the header of the packet, etc. For example, a first rule template associated with the ACL application includes a destination address field, a source address field, and an IP version field; and a second rule template associated with the ACL application includes the destination address field and the source address field, and excludes or masks the IP version field.

In some embodiments, the different rule templates associated with a particular packet processing application are associated with different priorities such that if packet information associated with a packet matches multiple ones of the rule templates, a processing action associated with a rule template of a higher priority is performed with respect to the packet. For example, for the LPM application, relatively longer prefixes generally have higher priorities. Thus, the packet is routed along a route associated with a longest matching prefix of an IP address of the packet, in an embodiment. As another example, for the ACL application, a first rule template that includes a destination address field, a source address field, and an IP version field is associated with a higher priority as compared to a second rule template that includes the destination address field and the IP version field, and excludes or masks the source address field. In this case, if packet information associated with a packet matches a rule based on the first rule template, then an action associated with the rule based on the first rule template is performed with respect to the packet. Further, if packet information associated with a packet does not match a rule based on the first rule template but matches a rule based on the second rule template, then an action associated with the rule based on the second rule template is performed with respect to the packet.

In an embodiment in which the network device supports multiple rule templates for each of at least packet processing applications, the search engine 118 is configured to iteratively perform multiple searches based on packet information associated with a packet until a match is found in the lookup table 140 or until the search engine 118 determines that the packet information does not match any rule associated with the packet processing application in the lookup table 140. In an embodiment, the search engine 118 includes a plurality of probabilistic data structures, such as approximate membership query (AMQ) filters (e.g., 122 associated with different rule templates supported by the network device 100. A respective probabilistic data structure 122 is configured to provide an indication of whether a matching rule for packet information based the corresponding rule template potentially exists in the lookup table 140. By providing indications of whether a matching rule for packet information based the corresponding rule template potentially exists in the lookup table 140, the probabilistic data structures 122 limit accesses to the lookup table 140 in a lookup operation by the search engine 118 to only rule templates for which a match is likely to exist in the lookup table 140, thereby generally reducing the number of accesses to the lookup table 140 in a particular lookup operation, in at least some embodiments. In an embodiment, respective probabilistic data structures 122 are configured to provide definitive negative indications if a particular search string generated based on a particular rule template is not stored in the lookup table 140. On the other hand, the respective probabilistic structures 122 are configured such that a probabilistic structures 122 can provide false positive indications that a particular search string generated based on a particular rule template is stored in the lookup table 140.

The rate or probability of false positive indications provided by a probabilistic structure 122 is determined by a length of the probabilistic data structure, in an embodiment. Thus, for example, a relatively longer probabilistic data structure 122 is used to reduce the rate or probability of false positive indications provided by the probabilistic data structure 122, in an embodiment. On the other hand, a relatively shorter probabilistic data structure 122 is used to reduce or otherwise conserve memory space occupied by the probabilistic data structure 122 at the expense of a higher, but acceptable, rate or probability of false positive indications provided by the probabilistic data structure 122, in an embodiment.

In an embodiment, when a probabilistic data structures 122 provides a false positive for a particular rule template, the search engine 118 performs an access to the lookup table 140 and determines that no match exists in the lookup table 140. Thus, the rate or probability of false positive indications provided by the probabilistic data structures 122 provides a tradeoff between the size of the probabilistic data structures 122 and performance of the search engine 118 in terms of extra accesses to the lookup table 140 performed in a lookup by the search engine 118, in various embodiments.

As explained in more detail below, in an embodiment, the search engine 118 is configured to apply respective subsets fields or bits of packet information received from a packet processing engine 116 to respective ones of a plurality of probabilistic data structures 122 associated with the packet processing application implemented by the processing engine 116 and to determine one or more rule templates for which corresponding matching rules are potentially stored in the lookup table 140. In an embodiment, the search engine 118 is configured to iteratively perform one or more searches in the lookup table 140 based on the one or more rule templates for which corresponding matching rules are potentially stored in the lookup table 140. For example, the search engine 118 is configured to iteratively perform the one or more searches in the lookup table 140 beginning with a highest priority rule templates among the one or more rule templates for which corresponding matching rules are potentially stored in the lookup table 140 and continuing decreasing priority rule templates among the one or more rule templates for which corresponding matching rules for which corresponding matching rules are potentially stored in the lookup table 140, until a match is found in the lookup table 140 or the search engine 118 determines that there is no match with any of the one or more rule templates for which corresponding matching rules for which corresponding matching rules are potentially stored in the lookup table 140. Accordingly, for some packets, the probabilistic data structures 122 provide approximate membership query indications that result in the search engine 118 iteratively performing multiple accesses to the lookup table 140 in a particular lookup operation. On other hand, for some packets, the probabilistic data structures 122 provide approximate membership query indications that result in the search engine 118 performing zero accesses to the lookup table 140 when the probabilistic data structures 122 definitively indicate that no rules matching corresponding packet information are stored in the lookup table 140. Nonetheless, the probabilistic data structures 122 guarantee that packets that are processed similarly and, thus, have same associated packet information (e.g., packets from a same flow having same source and destination and the same application) are kept in the order in which the packets are received by the network device as to not interfere with system functionality which relies on packet ordering, for example, in at least some embodiments.

In an embodiment, the probabilistic data structures 122 are relatively small data structures stored a memory that is relatively cheap memory, such as RAM memory, of the network device 100. On the other hand, in an embodiment, because by providing indications of rule templates for which matching entries 144 exist in the lookup table 140 enabling the search engine 118 to limit the number of access to the lookup table 140 to search for only rules that are likely to be stored in the lookup table 140 and in the order of decreasing priority of the rules that are likely the be stored in the lookup table 140, the probabilistic data structures 122 generally reduce the number of accesses performed by the search engine 118 to the lookup table 140, the probabilistic data structures 122 allow for the lookup table 140 to be stored in a relatively slow access deep memory, such as an external low cost DRAM device provided externally to the network device 100, in some embodiments.

In various embodiments, because the lookup table 140 stored in the memory includes interleaved entries associated with different packet processing applications, the memory is flexibly shared among the packet processing engines 116 that implement the different packet processing applications. For example, a new entry for use by any packet processing engine 116 configured to implement ant packet processing application can be added to the lookup table 114 as along as memory space is available anywhere in the memory that stores the lookup table 114, in at least some embodiments. Further, in at least some embodiments, because the search engine 118 is configured to maintain the plurality of probabilistic structures 122 and to determine rule templates for which corresponding matching rules for which corresponding matching rules are potentially stored in the lookup table 140 prior to performing one or more searches in the lookup table 140, the number of searches that the search engine 118 performs based on packet information received from the packet processing engines 116 is reduced as compared to systems that do not determine rule templates for which corresponding matching rules for which corresponding matching rules potentially exist a lookup table stored in a memory that allows a limited number (e.g., only one) search pattern to be searched at any given time.

Figure 2:
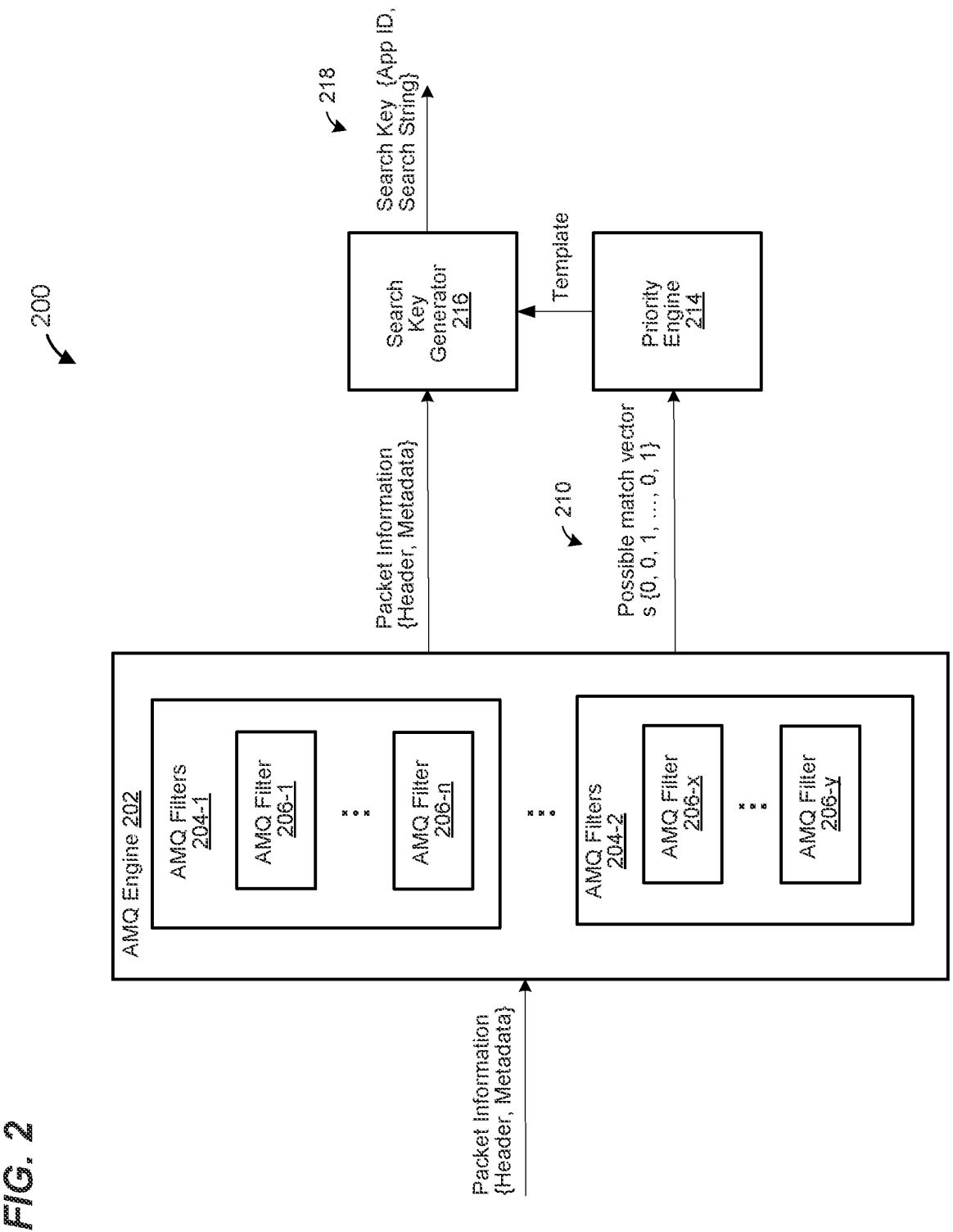
FIG. 2 is a flow diagram of an example search engine used with an exact-match lookup table such as the exact-match lookup table of FIG. 1, according to an embodiment.

FIG. 2 is a block diagram of a search engine 200, according to an embodiment. The search engine 200 corresponds to the search engine 118 of the network device 100 of FIG. 1, in an embodiment. In other embodiments, the search engine 200 is used in another suitable network device different than the network device 100 of FIG. 1. Similarly, the search engine 118 of the network device 100 of FIG. 1 is different from the search engine 200, in some embodiments.

The search engine 200 is configured to receive packet information from packet processing engines, such as the packet processing engines 116, that implement different packet processing applications to process a packet, and to perform lookups in a lookup table, such as the lookup table 140, that stores interleaved entries associated with the packet processing applications. The packet information received by the search engine 200 includes one or more data fields including packet header information and, optionally, metadata associated with the 3 packet. In an embodiment, the search engine 200 includes a probabilistic query engine, such as an AMQ engine, 202, configured to provide indications whether rules matching search stings generated based on different rule templates supported by the network device are present in lookup table. The AMQ engine 202 includes a plurality of probabilistic data structure sets, such as AMQ filter sets, 204, each including one or more probabilistic data structures, such as AMQ filters, 206, associated with different packet processing applications. In an embodiment, the probabilistic data structures 206 correspond to the probabilistic data structures 122 described above with reference to FIG. 1. In an embodiment, the AMQ engine 202 includes at least a first AMQ filter set 204-1, including one or more AMQ filters 206, associated with an LPM application and a second AMQ filter set 204-2, including one or more AMQ filters 206, associated with an ACL application. In other embodiments, the AMQ engine 202 additionally or alternatively includes AMQ filters associated with other suitable packet processing applications. In an embodiment, respective AMQ filter 206 are configured to provide definitive negative indications if a particular search string generated based on a particular rule template is not stored in the lookup table. On the other hand, the respective AMQ filter 206 are configured such that an AMQ filter 206 can provide false positive indications that a particular search string generated based on a particular rule template is stored in the lookup table. The rate or probability of false positive indications provided by an AMQ filter 206 is determined by a length of the AMQ filter 206, in an embodiment. Thus, for example, a relatively longer AMQ filter is used to reduce the rate or probability of false positive indications provided by the AMQ filter 206, in an embodiment.

In an embodiment, the search engine 200 is configured to, upon receiving packet information from a particular packet processing engine implementing a particular packet processing application, apply the packet information to respective AMQ filters associated with the particular packet processing application. In an embodiment, the search engine 200 is configured to mask different sets of bits in the packet information based on different rule templates associated with the respective AMQ filters 206 to generate respective masked sets of bits to be applied to the corresponding AMQ filters 206. In an embodiment, the AMQ engine 202 is configured to output a possible match vector 210 that indicates, for each rule template associated with a packet application, whether a rule that matches the corresponding search string generated for the packet possibly is stored in the lookup table. For example, the possible match vector 210 comprises a plurality of bits corresponding to the plurality of AMQ filters 206, where a value of logic one (1) of a bit corresponding to a particular AMQ indicates that a rule that matches the search string generated for the packet based on a rule template associated with the particular AMQ possibly is stored in the lookup table and a value of logic one (0) of a bit corresponding to a particular AMQ indicates that a rule that matches the search string generated for the packet based on a rule template associated with the particular AMQ possibly is definitely not stored in the lookup table.

The search engine 200 is configured to perform one or more accesses to the lookup table 200 to perform one or more accesses to the lookup table using one or more search strings for which the possible match vector 210 indicates a potential match in the lookup table 200. In an embodiment, the rules templates associated with the AMQ filters 206 are associated with different priorities, and the search engine 200 is configured to perform the one or more accesses to the lookup table beginning with a search string, among the one or more search strings for which the possible match vector 204 indicates a potential match in the lookup table 200, generated based on a rule template having a highest priority among the rule templates among the potentially matching rule templates.

The search engine 200 includes a priority engine 214 and a search key generator 216, in an embodiment. In an embodiment, the search key generator 216 is configured to generate receive packet information and to generate a search key 218 for a lookup operation to be performed based on the packet information. The search key 218 generated by the search key generator 216 the search string generated based on a rule template and an application identifier associated with the packet processing application. In an embodiment, the search string includes a subset of bits one or more data fields associated with the packet masked based on the rule template. For example, for an LPM application, the search key generator 216 is configured to generate the search key 218 to include i) a search string that includes a prefix of a destination IP address, included in a header of a packet, of a particular length masked based on the rule template and ii) an application indicator associated with the LMP application. As another example, for an ACL application, the search key generator 216 is configured to generate the search key 218 to include i) a search string that includes one or more data fields, associated with the packet, masked based on the rule template and ii) an application indicator associated with the ACL application. In some embodiments, the search key generator 216 is configured to generate the search key 218 to further include a template indicator indicating the rule template based on which the search key 218 is generated by the search key generator 216.

In some embodiments, the search engine 200 is configured to perform multiple iterations of accessing the lookup table by iteratively generating search keys based on rule templates indicated as likely being stored in the lookup table, beginning with a rule template associated with a highest priority and continuing with one or more rule templates associated with decreasing priorities, until a match is found in the lookup table, or it is determined that a matching entry is not present is the lookup table. For example, in an embodiment, the priority engine 214 is configured to receive the possible match vector provided by the AMQ engine 202, and to interactively provide indications of potentially matching rule templates to the search key generator 216.

The search engine 200 is configured to identify an entry in the lookup table based on the search key. For example, the search engine 200 is configured to hash the search key to generate a hash value that indicates the entry in the lookup table 220. The search engine is configured to determine whether the search key matches search information retrieved from the identified entry 244. In response to determining that the search key matches search information stored in the identified entry 244, the search engine 200 is configured to provide an indication of an associated action stored in the entry of the lookup table to the packet processing engine 116. The packet processing 116 is configured to perform the action to process the packet, in an embodiment.

Figure 3:
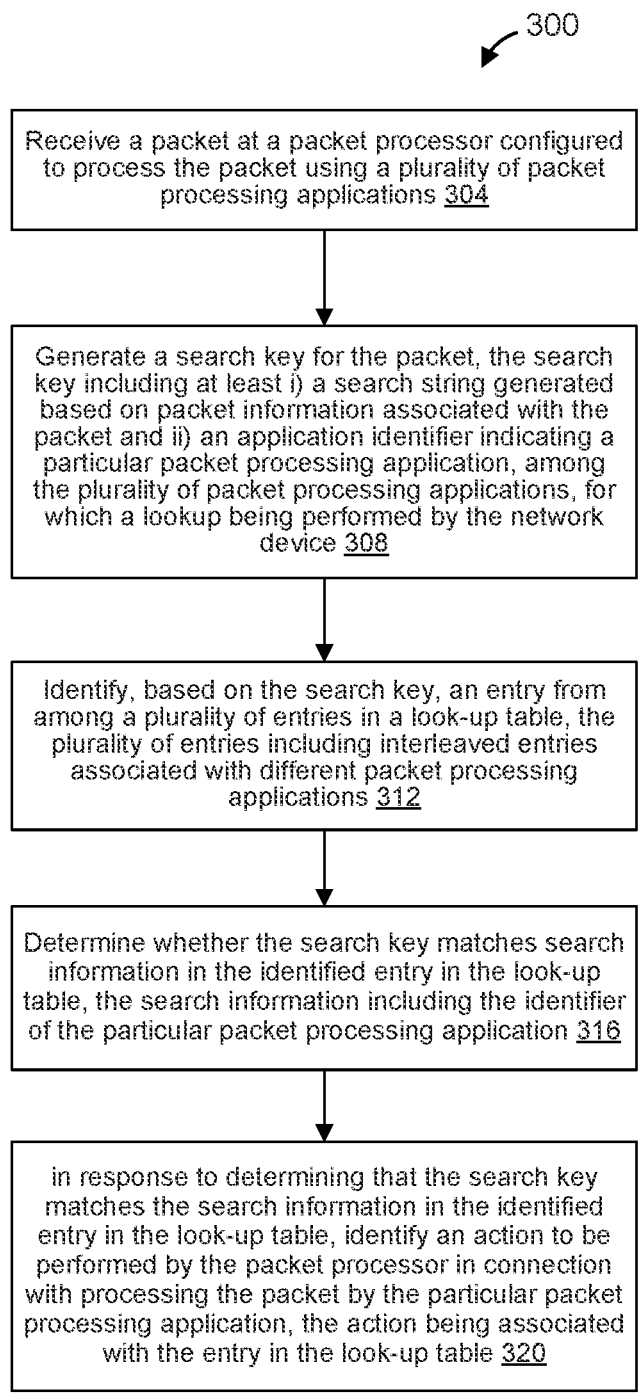
FIG. 3 is a flow diagram of an example method for determining actions to be performed on packets by a network device, according to an embodiment.

FIG. 3 is a flow diagram of an example method 300 for determining actions to be performed on packets by a network device, according to an embodiment. The method 300 is implemented by the example network device 100, according to an embodiment. The method 300 is implemented using the search engine 200 of FIG. 2, according to an embodiment. The method 300 is described with reference to FIGS. 1 and 2 merely for illustrative purposes. In other embodiments, the method 300 is implemented by another suitable network device different than the network device 100 of FIG. 1 and/or using a search engine different from the search engine 200 of FIG. 2.

At a block 304, a packet is received at a packet processor of the network device. For example, the packet is received at the packet processor 112 of the network device 100. In an embodiment, the packet processor is configured to process the packet using a plurality of packet processing applications. For example, the packet processor includes a plurality of packet processing engines, such as the packet processing engines 116, configured to implement respective ones of the plurality packet processing applications.

At a block 308, the network device generates a search key for the packet. In an embodiment, the search key includes at least i) a search string generated based packet information associated with the packet and ii) an application identifier indicating a particular packet processing application, among the plurality of packet processing applications, for which a lookup being performed by the network device. For example, the search engine 120 of FIG. 1 or the search engine 200 of FIG. 2 generates the search key to include i) the search string generated based on a set of one or more data fields associated with the packet and ii) the application identifier indicating a particular packet processing application, among the plurality of packet processing applications, for which the lookup is to be performed by the network device. In an embodiment, block 308 includes, prior to generating the search key, masking a subset of bits in the one or more data fields associated with the packet to generate a masked set of bits corresponding to a particular rule template associated with the particular packet processing application, and generating the search string to include the masked set of bits corresponding to the particular rule template.

At a block 312, the network device identifies, based on the search key generated at block 308, an entry from among a plurality of interleaved entries in a lookup table. In an embodiment, the plurality of interleaved entries in the lookup table includes at least a first set of entries associated with a first packet processing application among the plurality of packet processing operations interleaved with a second set of entries associated with a second packet processing application among the plurality of packet processing applications, where the second packet processing application is different from the first packet processing application.

At a block 316, the network device determines whether the search key matches search information in the identified entry in the lookup table. In an embodiment, the search information includes the application identifier of the particular packet processing application. Accordingly, in an embodiment, determining whether the search key matches search information in the identified entry in the lookup table includes determining whether the application identifier included in the search information in the lookup table matches the application identifier included in the search key.

In some embodiments in which the network device supports multiple rule templates for the particular packet processing application, blocks 308-316 are iteratively performed by the network device until a match is found in the lookup table or until it is determined that packet information does not match any rule associated with the particular packet processing application in the lookup table. In an embodiment, the method includes, prior to performing the one or more iterations, applying respective masked sets of bits to respective ones of a plurality of probabilistic data structures maintained by the network device, where respective ones of the plurality of probabilistic data structures represent likelihoods of entries corresponding to respective ones of the different rule templates being present in the lookup table, and identifying, based on applying the respective masked sets of bits to respective ones of the plurality of probabilistic data structures, one or more rule templates for which a potential matching entry exists in the lookup table. In an embodiment, blocks 208-316 are iteratively performed using the respective sets of masked bits corresponding to the identified one or more rule templates until a match is found in the lookup table or it is determined that no match exists in the lookup table.

At a block 320, in response to determining that the search key matches the search information in the identified entry in the lookup table, the network device identifies an action to be performed by the packet processor in connection with processing the packet by the particular packet processing application, where the action being is associated with the entry, identified at the block 312, in the lookup table.

Embodiment 1: A network device comprises: a packet processor configured to process packets communicated over a network, the packet processor being configured to process a packet using a plurality of packet processing applications; and a search engine configured to perform a lookup based on packet information associated with a packet being processed by the packet processor, the lookup including one or more accesses to a lookup table that includes a plurality of interleaved entries including entries of at least a first set of entries associated with a first packet processing application interleaved with entries of a second set of entries associated with a second packet processing application different from the first packet processing application, the search engine being configured to, for each of the one or more accesses to the lookup table: generate a search key to include at least i) a search string generated based on the packet information associated with the packet and ii) an application identifier indicating a particular packet processing application, among the plurality of packet processing applications, for which the lookup is being performed, identify, based on the search key, an entry from among the interleaved entries in the lookup table, determine whether the search key matches search information in the identified entry in the lookup table, the search information including the application identifier of the particular packet processing application, and in response to determining that the search key matches the search information in the identified entry in the lookup table, identify an action to be performed by the packet processor in connection with processing the packet by the particular packet processing application, the action being associated with the entry in the lookup table.

Embodiment 2: The network device of embodiment 1, wherein the search engine is configured to: prior to performing the one or more accesses to the lookup table, determine based on applying packet information to one or more probabilistic data structures maintained by the network device, whether one or more entries in the lookup table likely store search information that matches at least a subset of the packet information, and perform the one or more accesses to the lookup table to identify at least one entry among the one or more entries that likely store search information that matches at least a subset of the packet information in the lookup table in the lookup table.

Embodiment 3: The network device of embodiment 1, wherein the search engine is further configured to apply respective masked sets of bits in the packet information associated with the packet to respective ones of a plurality of probabilistic data structures maintained by the network device, respective ones of the plurality of probabilistic data structures representing likelihoods of entries corresponding to respective ones of the different rule templates being present in the lookup table, and identify, based on applying the respective masked sets of bits to respective ones of the plurality of probabilistic data structures, one or more rule templates for which a potential matching entry exists in the lookup table, wherein the search engine is configured to perform the one or more accesses to the lookup table based on the identified rule templates for which a potential matching entry exists in the lookup table.

Embodiment 4: The network device of any of embodiments 1-3, wherein the search engine is configured to iteratively perform one or more accesses to the lookup table using the respective sets of masked bits corresponding to the identified one or more rule templates until a match is found in the lookup table or it is determined that no match exists in the lookup table.

Embodiment 5: The network device of embodiment 4, wherein the search engine is configured to, in a particular access to the lookup table among the one or more accesses to the lookup table, generate the search string to include a particular masked set of bits corresponding to a particular rule template among the one or more rule templates for which a potential match exists in the lookup table.

Embodiment 6: The network device of embodiments 4 or 5, wherein: respective ones of the one or more rule templates as associated with respective priorities, and the search engine is configured to iteratively perform the one or more accesses to the lookup table using respective sets of masked bits corresponding to the one or more rule templates starting with a rule template associated with a higher priority among the respective priority and continuing with masked sets of bits corresponding to decreasing order of priorities.

Embodiment 7: The network device of any of embodiments 1-6, wherein the search engine is configured to apply the respective masked sets of bits to respective ones of the plurality of probabilistic data structures at least by applying the respective masked sets of bits to respective ones of approximate membership query (AMQ) filters maintained by the network device, respective ones of the AMQ filters representing likelihoods of entries corresponding to respective ones of the different rule templates being present in the lookup table.

Embodiment 8: The network device of any of embodiments 1-7, wherein the plurality of packet processing applications includes at least an access control list (ACL) application and a longest prefix match (LPM) application.

Embodiment 9: The network device of any of embodiment 8, wherein the lookup table includes entries associated with the ACL application interleaved with entries associated with the LPM application.

Embodiment 10: The network device of any of embodiments 1-9, wherein the lookup table is stored in one of an internal random access memory (RAM) device of the network device or a dynamic random access memory (DRAM) device externally coupled to the network device.

Embodiment 11: A method for determining actions to be performed on packets in a network device, the method comprising: receiving a packet at a packet processor of the network device, the packet processor configured to process the packet using a plurality of packet processing applications; and performing one or more accesses to a lookup table based on packet information associated with the packet, including, for each memory access among the one or more memory access, generating, at the network device, a search key for the packet, the search key including at least i) a search string generated based on the packet information associated with the packet and ii) an application identifier indicating a particular packet processing application, among the plurality of packet processing applications, for which the lookup is being performed; identifying, by the network device based on the search key, an entry from among a plurality of interleaved entries in the lookup table, the plurality of interleaved entries including at least a first set of entries associated with a first packet processing application among the plurality of packet processing operations interleaved with a second set of entries associated with a second packet processing application among the plurality of packet processing applications, the second packet processing application being different from the first packet processing application; determining whether the search key matches search information in the identified entry in the lookup table, the search information including the identifier of the particular packet processing application; and in response to determining that the search key matches the search information in the identified entry in the lookup table, identifying an action to be performed by the packet processor in connection with processing the packet by the particular packet processing application, the action being associated with the entry in the lookup table.

Embodiment 12: The method of embodiment 11, further comprising, prior to performing the one or more accesses to the lookup table, determining based on applying packet information to one or more probabilistic data structures maintained by the network device, whether one or more entries in the lookup table likely store search information that matches at least a subset of the packet information, wherein performing the one or more accesses to the lookup table comprises performing the one or more accesses to identify at least one entry among the one or more entries that likely store search information that matches at least a subset of the packet information in the lookup table.

Embodiment 13: The method of embodiment 11, further comprising: prior to performing the one or more accesses to the lookup table, applying respective masked sets of bits to respective ones of a plurality of probabilistic data structures maintained by the network device, respective ones of the plurality of probabilistic data structures representing likelihoods of entries corresponding to respective ones of the different rule templates being present in the lookup table, and identifying, based on applying the respective masked sets of bits to respective ones of the plurality of probabilistic data structures, one or more rule templates for which a potential matching entry exists in the lookup table, wherein performing the one or more accesses to the lookup table comprises performing the one or more accesses based on the identified rule templates for which a potential matching entry exists in the lookup table.

Embodiment 14: The method of any of embodiments 11-13, wherein identifying the entry in the lookup table includes iteratively performing one or more accesses to the lookup table using the respective sets of masked bits corresponding to the identified one or more rule templates until a match is found in the lookup table or it is determined that no match exists in the lookup table.

Embodiment 15: The method of embodiment 14, wherein iteratively performing one or more accesses to the lookup table includes, for a particular access to the lookup among the one or more accesses to the lookup table, generate the search string to include a particular masked set of bits corresponding to a particular rule template among the one or more rule templates for which a potential match exists in the lookup table.

Embodiment 15: The method of embodiments 14 or 15, wherein: respective ones of the one or more rule templates as associated with respective priorities, and iteratively performing the one or more accesses to the lookup table includes generating one or more search kyes with respective sets of masked bits corresponding to the one or more rule templates starting with a rule template associated with a higher priority among the respective priority and continuing with masked sets of bits corresponding to decreasing order of priorities.

Embodiment 16: The method of any of embodiments 13-15, wherein applying the respective masked sets of bits to respective ones of the plurality of probabilistic data structures comprises applying the respective masked sets of bits to respective ones of approximate membership query (AMQ) filters maintained by the network device, respective ones of the AMQ filters representing likelihoods of entries corresponding to respective ones of the different rule templates being present in the lookup table.

Embodiment 18: The method of any of embodiments 11-17, wherein receiving the packet at the packet processor of the network device comprises receiving the packet at a packet processing configured to process the packet using at least an access control list (ACL) application and a longest prefix match (LPM) application.

Embodiment 19: The method of embodiment 18, wherein identifying the entry in the lookup table comprises identifying the entry from among entries associated with the ACL application that are interleaved with entries associated with the LPM application.

Embodiment 20: The method of any of embodiment 11-19, wherein identifying the entry in the lookup table comprises performing the one or more accesses to a memory device in which the lookup table is stored, wherein the memory device comprises one of an internal random access memory (RAM) device of the network device or a dynamic random access memory (DRAM) device externally coupled to the network device.

At least in some embodiments, because the lookup table stored in the memory includes interleaved entries associated with different packet processing applications, the memory is flexibly shared among the packet processing applications. For example, a new entry for use by any packet processing application among the plurality of packet processing applications can be added to the lookup table as along as memory space is available in the memory shared by the packet processing applications. Moreover, in at least some embodiments, because the network device is configured to maintain a plurality of probabilistic data structures configured to provide indications of rule templates for which matching rules potentially exist in the lookup table, and to apply packet information to multiple probabilistic data structures prior to performing one or more searches in the lookup table such that the searches are limited to only rule templates for which matching rules potentially exist in the lookup table, a memory, such as RAM, that is less expensive in terms of cost, power consumption, occupied area, etc. as compared to a TCAM, is used to store the lookup table with a minimized increase in the number of accesses needed to be performed to identify a matching rule based on packet information in the lookup table.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a packet processor configured to process packets communicated over a network, the packet processor being configured to process a packet using a plurality of packet processing applications; and
a search engine configured to perform a lookup based on packet information associated with a packet being processed by the packet processor, the lookup including one or more accesses to a lookup table that includes a plurality of interleaved entries including entries of at least a first set of entries associated with a first packet processing application interleaved with entries of a second set of entries associated with a second packet processing application different from the first packet processing application, the search engine being configured to, for each of the one or more accesses to the lookup table:
generate a search key to include at least i) a search string generated based on the packet information associated with the packet and ii) an application identifier indicating a particular packet processing application, among the plurality of packet processing applications, for which the lookup is being performed,
identify, based on the search key, an entry from among the interleaved entries in the lookup table,
determine whether the search key matches search information in the identified entry in the lookup table, the search information including the application identifier of the particular packet processing application, and
in response to determining that the search key matches the search information in the identified entry in the lookup table, identify an action to be performed by the packet processor in connection with processing the packet by the particular packet processing application, the action being associated with the entry in the lookup table.

2. The network device of claim 1, wherein the search engine is configured to:
prior to performing the one or more accesses to the lookup table, determine based on applying packet information to one or more probabilistic data structures maintained by the network device, whether one or more entries in the lookup table likely store search information that matches at least a subset of the packet information, and
perform the one or more accesses to the lookup table to identify at least one entry among the one or more entries that likely store search information that matches at least a subset of the packet information in the lookup table.

3. The network device of claim 1, wherein the search engine is further configured to apply respective masked sets of bits in the packet information associated with the packet to respective ones of a plurality of probabilistic data structures maintained by the network device, respective ones of the plurality of probabilistic data structures representing likelihoods of entries corresponding to respective ones of the different rule templates being present in the lookup table, and
identify, based on applying the respective masked sets of bits to respective ones of the plurality of probabilistic data structures, one or more rule templates for which a potential matching entry exists in the lookup table, wherein the search engine is configured to perform the one or more accesses to the lookup table based on the identified rule templates for which a potential matching entry exists in the lookup table.

4. The network device of claim 3, wherein the search engine is configured to iteratively perform one or more accesses to the lookup table using the respective sets of masked bits corresponding to the identified one or more rule templates until a match is found in the lookup table or it is determined that no match exists in the lookup table.

5. The network device of claim 4, wherein the search engine is configured to, in a particular access to the lookup table among the one or more accesses to the lookup table, generate the search string to include a particular masked set of bits corresponding to a particular rule template among the one or more rule templates for which a potential match exists in the lookup table.

6. The network device of claim 4, wherein:
respective ones of the one or more rule templates as associated with respective priorities, and
the search engine is configured to iteratively perform the one or more accesses to the lookup table using respective sets of masked bits corresponding to the one or more rule templates starting with a rule template associated with a higher priority among the respective priority and continuing with masked sets of bits corresponding to decreasing order of priorities.

7. The network device of claim 3, wherein the search engine is configured to apply the respective masked sets of bits to respective ones of the plurality of probabilistic data structures at least by applying the respective masked sets of bits to respective ones of approximate membership query (AMQ) filters maintained by the network device, respective ones of the AMQ filters representing likelihoods of entries corresponding to respective ones of the different rule templates being present in the lookup table.

8. The network device of claim 1, wherein the plurality of packet processing applications includes at least an access control list (ACL) application and a longest prefix match (LPM) application.

9. The network device of claim 8, wherein the lookup table includes entries associated with the ACL application interleaved with entries associated with the LPM application.

10. The network device of claim 1, wherein the lookup table is stored in one of an internal random access memory (RAM) device of the network device or a dynamic random access memory (DRAM) device externally coupled to the network device.

11. A method for determining actions to be performed on packets in a network device, the method comprising:
receiving a packet at a packet processor of the network device, the packet processor configured to process the packet using a plurality of packet processing applications; and
performing one or more accesses to a lookup table based on packet information associated with the packet, including, for each memory access among the one or more memory access,
generating, at the network device, a search key for the packet, the search key including at least i) a search string generated based on the packet information associated with the packet and ii) an application identifier indicating a particular packet processing application, among the plurality of packet processing applications, for which the lookup is being performed;
identifying, by the network device based on the search key, an entry from among a plurality of interleaved entries in the lookup table, the plurality of interleaved entries including at least a first set of entries associated with a first packet processing application among the plurality of packet processing operations interleaved with a second set of entries associated with a second packet processing application among the plurality of packet processing applications, the second packet processing application being different from the first packet processing application;
determining whether the search key matches search information in the identified entry in the lookup table, the search information including the identifier of the particular packet processing application; and
in response to determining that the search key matches the search information in the identified entry in the lookup table, identifying an action to be performed by the packet processor in connection with processing the packet by the particular packet processing application, the action being associated with the entry in the lookup table.

12. The method of claim 11, further comprising, prior to performing the one or more accesses to the lookup table, determining based on applying packet information to one or more probabilistic data structures maintained by the network device, whether one or more entries in the lookup table likely store search information that matches at least a subset of the packet information, wherein performing the one or more accesses to the lookup table comprises performing the one or more accesses to identify at least one entry among the one or more entries that likely store search information that matches at least a subset of the packet information in the lookup table.

13. The method of claim 11, further comprising:
prior to performing the one or more accesses to the lookup table,
applying respective masked sets of bits to respective ones of a plurality of probabilistic data structures maintained by the network device, respective ones of the plurality of probabilistic data structures representing likelihoods of entries corresponding to respective ones of the different rule templates being present in the lookup table, and
identifying, based on applying the respective masked sets of bits to respective ones of the plurality of probabilistic data structures, one or more rule templates for which a potential matching entry exists in the lookup table, wherein performing the one or more accesses to the lookup table comprises performing the one or more accesses based on the identified rule templates for which a potential matching entry exists in the lookup table.

14. The method of claim 13, wherein identifying the entry in the lookup table includes iteratively performing one or more accesses to the lookup table using the respective sets of masked bits corresponding to the identified one or more rule templates until a match is found in the lookup table or it is determined that no match exists in the lookup table.

15. The method of claim 14, wherein iteratively performing one or more accesses to the lookup table includes, for a particular access to the lookup among the one or more accesses to the lookup table, generate the search string to include a particular masked set of bits corresponding to a particular rule template among the one or more rule templates for which a potential match exists in the lookup table.

16. The method of claim 14, wherein:
respective ones of the one or more rule templates as associated with respective priorities, and
iteratively performing the one or more accesses to the lookup table includes generating one or more search keys with respective sets of masked bits corresponding to the one or more rule templates starting with a rule template associated with a higher priority among the respective priority and continuing with masked sets of bits corresponding to decreasing order of priorities.

17. The method of claim 13, wherein applying the respective masked sets of bits to respective ones of the plurality of probabilistic data structures comprises applying the respective masked sets of bits to respective ones of approximate membership query (AMQ) filters maintained by the network device, respective ones of the AMQ filters representing likelihoods of entries corresponding to respective ones of the different rule templates being present in the lookup table.

18. The method of claim 11, wherein receiving the packet at the packet processor of the network device comprises receiving the packet at a packet processing configured to process the packet using at least an access control list (ACL) application and a longest prefix match (LPM) application.

19. The method of claim 18, wherein identifying the entry in the lookup table comprises identifying the entry among entries associated with the ACL application that are interleaved with entries associated with the LPM application.

20. The method of claim 11, wherein identifying the entry in the lookup table comprises performing the one or more accesses to a memory device in which the lookup table is stored, wherein the memory device comprises one of an internal random access memory (RAM) device of the network device or a dynamic random access memory (DRAM) device externally coupled to the network device.

* * * * *